US010536716B2

(12) United States Patent
Zhao et al.

(10) Patent No.: US 10,536,716 B2
(45) Date of Patent: Jan. 14, 2020

(54) APPARATUS AND METHOD FOR VIDEO MOTION COMPENSATION

(71) Applicant: Huawei Technologies Co., Ltd., Shenzhen (CN)

(72) Inventors: Zhijie Zhao, Munich (DE); Yiqun Liu, Munich (DE); Joern Ostermann, Munich (DE)

(73) Assignee: Huawei Technologies Co., Ltd., Shenzhen (CN)

(*) Notice: Subject to any disclaimer, the term of this patent is extended or adjusted under 35 U.S.C. 154(b) by 93 days.

(21) Appl. No.: 15/819,801

(22) Filed: Nov. 21, 2017

(65) Prior Publication Data
US 2018/0160142 A1 Jun. 7, 2018

Related U.S. Application Data

(63) Continuation of application No. PCT/EP2015/061278, filed on May 21, 2015.

(51) Int. Cl.
*H04N 19/573* (2014.01)
*H04N 19/105* (2014.01)
(Continued)

(52) U.S. Cl.
CPC ......... *H04N 19/573* (2014.11); *H04N 19/105* (2014.11); *H04N 19/117* (2014.11);
(Continued)

(58) Field of Classification Search
CPC .................................................. H04N 19/573
See application file for complete search history.

(56) References Cited

U.S. PATENT DOCUMENTS 5,659,363 A * 8/1997 Wilkinson ............. G06T 9/008
375/240.11
7,412,002 B2 * 8/2008 Koshiba ................. H04N 19/80
375/240.16
(Continued)

FOREIGN PATENT DOCUMENTS

CN    1671209 A    9/2005
CN    1886980 A    12/2006
(Continued)

OTHER PUBLICATIONS

Sullivan et al., "Overview of the High Efficiency Video Coding (HEVC) Standard," IEEE Transactions on Circuits and Systems for Video Technology, vol. 22, No. 12, pp. 1649-1668, Institute of Electrical and Electronics Engineers, New York, New York (Dec. 2012).

(Continued)

*Primary Examiner* — James M Pontius
(74) *Attorney, Agent, or Firm* — Leydig, Voit & Mayer, Ltd.

(57) ABSTRACT

A frame buffer is adapted to store at least one reference frame of a video stream, said reference frame being different from a current frame of the video stream. A motion estimation unit is adapted to generate a motion vector by estimating motion between a reference block of the reference frame and a current block of the current frame. A blurring filter selection unit is adapted to select one of a plurality of blurring filters depending on the orientation of the motion vector. A filtering unit is adapted to generate a filtered reference block by applying the selected blurring filter to the reference block. A motion compensation unit is adapted to generate a filtered prediction block of the current block on the basis of the current block, the motion vector and the filtered reference block.

21 Claims, 8 Drawing Sheets

(51) Int. Cl.

| | | |
|---|---|---|
| *H04N 19/139* | (2014.01) | |
| *H04N 19/70* | (2014.01) | |
| *H04N 19/82* | (2014.01) | |
| *H04N 19/533* | (2014.01) | |
| *H04N 19/567* | (2014.01) | |
| *H04N 19/176* | (2014.01) | |
| *H04N 19/147* | (2014.01) | |
| *H04N 19/117* | (2014.01) | |
| *H04N 19/513* | (2014.01) | |
| *H04N 19/65* | (2014.01) | |
| *H04N 19/124* | (2014.01) | |
| *H04N 19/129* | (2014.01) | |
| *H04N 19/13* | (2014.01) | |
| *H04N 19/18* | (2014.01) | |
| *H04N 19/593* | (2014.01) | |

(52) U.S. Cl.
CPC ......... *H04N 19/139* (2014.11); *H04N 19/147* (2014.11); *H04N 19/176* (2014.11); *H04N 19/513* (2014.11); *H04N 19/533* (2014.11); *H04N 19/567* (2014.11); *H04N 19/65* (2014.11); *H04N 19/70* (2014.11); *H04N 19/82* (2014.11); *H04N 19/124* (2014.11); *H04N 19/129* (2014.11); *H04N 19/13* (2014.11); *H04N 19/18* (2014.11); *H04N 19/593* (2014.11)

(56) References Cited

U.S. PATENT DOCUMENTS

| | | | |
|---|---|---|---|
| 7,693,343 | B2 | 4/2010 | Klompenhouwer et al. |
| 7,787,542 | B2* | 8/2010 | Sun ................... H04N 19/51 375/240.29 |
| 8,363,724 | B2 | 1/2013 | Su et al. |
| 8,704,843 | B2* | 4/2014 | Saito ................... G09G 3/20 345/474 |
| 2001/0048720 | A1 | 12/2001 | Koshiba et al. |
| 2003/0086496 | A1* | 5/2003 | Zhang ............... G06K 9/00711 375/240.16 |
| 2005/0207496 | A1 | 9/2005 | Komiya |
| 2006/0143542 | A1 | 6/2006 | Jones et al. |
| 2006/0171569 | A1 | 8/2006 | Budagavi |
| 2007/0126928 | A1* | 6/2007 | Klompnhouwer ....... H04N 5/21 348/497 |
| 2009/0060376 | A1* | 3/2009 | Nam ................... H04N 19/196 382/268 |
| 2010/0026880 | A1 | 2/2010 | Ito et al. |
| 2010/0253793 | A1* | 10/2010 | Auberger ........... H04N 5/23248 348/208.4 |
| 2010/0278267 | A1 | 11/2010 | Lai et al. |
| 2010/0329344 | A1 | 12/2010 | Hayase et al. |
| 2011/0110431 | A1 | 5/2011 | Laroche et al. |
| 2011/0158320 | A1* | 6/2011 | Zheng ................... H04N 19/50 375/240.16 |
| 2011/0274174 | A1* | 11/2011 | Francois ............... H04N 19/159 375/240.16 |
| 2012/0163459 | A1* | 6/2012 | Tsyrganovich ....... H04N 19/513 375/240.16 |
| 2012/0170665 | A1 | 7/2012 | Demos |
| 2012/0195368 | A1 | 8/2012 | Chien et al. |
| 2012/0213271 | A1 | 8/2012 | Chong et al. |
| 2013/0016773 | A1 | 1/2013 | Oh |
| 2013/0070862 | A1 | 3/2013 | Koh et al. |
| 2013/0077685 | A1 | 3/2013 | Chen et al. |
| 2013/0235274 | A1* | 9/2013 | Nasu ................... H04N 5/145 348/699 |
| 2013/0287095 | A1* | 10/2013 | Guo ................... H04N 19/172 375/240.02 |
| 2013/0301729 | A1 | 11/2013 | Demos |
| 2014/0036033 | A1 | 2/2014 | Takahashi et al. |
| 2014/0072043 | A1* | 3/2014 | Tourapis ............... H04N 19/159 375/240.15 |
| 2015/0063457 | A1* | 3/2015 | Gamei ................. H04N 19/122 375/240.16 |
| 2015/0304680 | A1* | 10/2015 | Ling .................... H04N 19/105 375/240.16 |
| 2017/0134744 | A1* | 5/2017 | Jung ................... H04N 19/52 |
| 2018/0075660 | A1* | 3/2018 | Jouet ................... G06T 19/006 |
| 2018/0082133 | A1* | 3/2018 | Guarneri ............... G06T 7/246 |
| 2019/0028703 | A1* | 1/2019 | Tamse ................. H04N 19/176 |
| 2019/0068967 | A1* | 2/2019 | Ikai ..................... H04N 19/593 |

FOREIGN PATENT DOCUMENTS

| | | |
|---|---|---|
| CN | 101640801 A | 2/2010 |
| CN | 101965732 A | 2/2011 |
| CN | 101969569 A | 2/2011 |
| CN | 102907099 A | 1/2013 |
| CN | 103503459 A | 1/2014 |
| CN | 104602006 A | 5/2015 |
| JP | 2006513592 A | 4/2006 |
| RU | 2391720 C2 | 6/2010 |
| RU | 2549162 C1 | 4/2015 |
| RU | 2550554 C2 | 5/2015 |
| WO | 2006108654 A2 | 10/2006 |
| WO | 2009131508 A2 | 10/2009 |
| WO | 2015051011 A1 | 4/2015 |

OTHER PUBLICATIONS

Vatis et al., "Adaptive Interpolation Filter for H.264/AVC," IEEE Transactions on Circuits and Systems for Video Technology, vol. 19, No. 2, pp. 179-192, Institute of Electrical and Electronics Engineers, New York, New York (Feb. 2009).

Jang et al., "Pre-Filtering with Locally Adaptive Filter Set for Reference Frame in Video Compression," IEEE International Conference on Multimedia and Expo (ICME), XP31964611, Institute of Electrical and Electronics Engineers, New York, New York (2011).

Laude et al., "Motion Blur Compensation in Scalable HEVC Hybrid Video Coding," IEEE Picture Coding Symposium (PCS), XP3256696, pp. 313-316, Institute of Electrical and Electronics Engineers, New York, New York (2013).

Budagavi, "Video Compression using Blur Compensation," IEEE International Conference on Image Processing, XP10851195, Institute of Electrical and Electronics Engineers, New York, New York (2005).

Bossen, "Common test conditions and software reference configurations," Joint Collaborative Team on Video Coding (JCT-VC) of ITU-T SG16 WP3 and ISO/IEC JTC1/SC29/WG11, Document: JCTVC:H1100, WG11 No. m24011, 8th Meeting: San Jose, CA, USA, pp. 1-3, International Telecommunication Union, Geneva, Switzerland (Feb. 1-10, 2012).

Lai et al., "Adaptive Filtering for Video Coding with Focus Change," IEEE International Conference on Acoustics, Speech, and Signal Processing, XP31462948, pp. 661-664, Institute of Electrical and Electronics Engineers, New York, New York (2007).

* cited by examiner

Coefficients $a = 8/56$
$b = 1/56$
$c = 7/56$
$d = 3/56$
$e = 5/56$
$f = 5/56$
$g = 3/56$

| $\theta$ | $\left[0, \arcsin\frac{1}{3}\right]$ | $\left[\arcsin\frac{1}{3}, \arccos\frac{1}{3}\right]$ | $\left[\arccos\frac{1}{3}, \pi-\arccos\frac{1}{3}\right]$ | $\left[\pi-\arccos\frac{1}{3}, \pi-\arcsin\frac{1}{3}\right]$ | $\left[\pi-\arcsin\frac{1}{3}, \pi\right]$ |
|---|---|---|---|---|---|
| a | 0 | 0 | $\frac{1}{2} - \frac{1}{6}\frac{1}{\sin\theta}$ | $\frac{1}{2} - \frac{1}{6}\min(\sin\theta, -\cos\theta)$ | 0 |
| b | 0 | $\max\left(0, \frac{1}{6}\left(\frac{1}{\cos\theta} - \frac{1}{\sin\theta}\right)\right)$ | | $\max\left(0, -\frac{1}{6}\left(\frac{1}{\cos\theta} + \frac{1}{\sin\theta}\right)\right)$ | 0 |
| c | 0 | $\frac{1}{2} - \frac{1}{6}\min(\sin\theta, \cos\theta)$ | 0 | 0 | 0 |
| d | $\frac{1}{2} - \frac{1}{6}\frac{1}{\cos\theta}$ | $\max\left(0, \frac{1}{6}\left(\frac{1}{\sin\theta} - \frac{1}{\cos\theta}\right)\right)$ | | $\max\left(0, \frac{1}{6}\left(\frac{1}{\sin\theta} + \frac{1}{\cos\theta}\right)\right)$ | $\frac{1}{2} + \frac{1}{6}\frac{1}{\cos\theta}$ |
| e | | | $\frac{1}{3}\frac{1}{\max(|\cos\theta|, \sin\theta)}$ | | |

FIG. 8

$$
3\times 3 \text{ Filter} \qquad \theta = 15° \qquad \theta = 60°
$$

$$
\begin{bmatrix} a & b & c \\ d & e & d \\ c & b & a \end{bmatrix} \quad \begin{bmatrix} 0 & 0 & 0 \\ 0.327 & 0.345 & 0.327 \\ 0 & 0 & 0 \end{bmatrix} \quad \begin{bmatrix} 0 & 0.141 & 0.167 \\ 0 & 0.381 & 0 \\ 0.167 & 0.141 & 0 \end{bmatrix}
$$

FIG. 9

APPARATUS AND METHOD FOR VIDEO MOTION COMPENSATION

CROSS-REFERENCE TO RELATED APPLICATIONS

This application is a continuation of International Application No. PCT/EP2015/061278, filed on May 21, 2015, the disclosure of which is hereby incorporated by reference in its entirety.

TECHNICAL FIELD

The present disclosure generally relates to the field of video processing and to an apparatus for video motion compensation, and specifically relates to a video coder and to a video decoder for supporting motion compensation to predict frames in a video. The present disclosure relates further to a method for coding and to a method for decoding a video stream using motion compensation. Finally, the present invention relates to a computer program having a program code for performing such a method.

BACKGROUND

In the field of video processing, and in particular in the field of hybrid video coding and compression, it is known to use inter and intra picture prediction as well as transform coding. Such hybrid video coding technologies are used in known video compression standards like H.261, H.263, MPEG-1, 2, 4, H.264/AVC or HEVC.

FIG. 1 shows a video coder according to the state of the art. A video coder 100 comprises an input for receiving input pictures and an output for generating a coded video stream. The video coder 100 is adapted to apply prediction, transformation, quantization, and entropy coding to a video sequence. The transformation, quantization, and entropy coding are carried out respectively by a transform and quantize unit 101 and by an entropy encoder 103. Between the transform and quantize unit 101 and the entropy encoder 103, a scan unit 102 is provided.

The video sequence corresponds to a plurality of input pictures, wherein each picture is divided into blocks of a certain size that are either intra or inter coded. The blocks of the first picture of a video sequence are intra coded by means of an intra prediction unit 109. An intra picture is coded using only the information within the same picture, so that it can be independently decoded and it can provide an entry point in the bit stream for random access.

For inter coded pictures, information from previous and/or future coded pictures, which are called reference pictures, are used to reduce the temporal redundancy. Reference pictures are processed by an inverse scan, dequantize, inverse transform unit 104, by deblocking and SAO (sample adaptive offset) filters 105 and are stored in a frame buffer 106. Each block of an inter coded picture is predicted from a block of the same size in the reference pictures.

A motion estimation is applied by a motion estimation unit 107 to select motion data, such as for example a motion vector (MV), a mode decision, and reference frames. The motion estimation unit 107 comprises as input a picture to be inter coded and a reference picture. Motion data are selected based on certain cost function to minimize the difference between the original block and its predicted block. A coder control unit 110 selects the motion information, such as motion vector or reference frame index, based on the rate distortion optimization procedure.

A motion compensation carried out by a motion compensation unit 108 uses the motion data, which are coded and transmitted as side information to the decoder, to generate prediction signals or motion compensated frame signals. The difference between the original block and its prediction, which is called residual or prediction error, is then transformed. The transform coefficients are usually quantized, scanned, entropy coded and transmitted together with the motion data.

The decoder processing, which is part of the video coder 100, is shown in the dashed box 111 in FIG. 1. FIG. 2 shows a video decoder 200 according to the state of the art. The video decoder 200 comprises, similarly to the video coder 100, an entropy decoder 203, an inverse scan, dequantize, inverse transform unit 204, a deblocking filter and SAO unit 205, a frame buffer 206, a motion compensation unit 208 and an intra prediction unit 209.

Both the video coder 100 and video decoder 200 generate identical predictions. The residual data is reconstructed by the inverse scan, dequantize, inverse transform unit 204. The approximated input picture is reconstructed block-wise by adding the residual to the prediction. The result of the addition may be further fed into loop filters to smooth out artifacts. The final reconstructed picture is then store in the picture or frame buffer 206, which can be used for the prediction of subsequence pictures.

The motion compensation, as for example applied in the video coder 100 of FIG. 1 and in the video decoder of FIG. 2, is one of the most important elements in hybrid video coding/decoding. The motion compensation utilizes temporal information to predict the current block and reduces thereby the redundancy of a video. The accuracy of prediction depends on the similarity of the content between the reference block and the current block. With the change of velocity of the camera or certain objects in a scene, which is typically expected in action and sports movies, motion blur varies from frame to frame leading to reduced prediction accuracy.

The general motion compensation method from video coding standards works well with stationary objects or moving objects of constant velocity. However, its accuracy is limited in case of varying motion blur. Motion blur occurs in the direction of object motion if an object moves during the exposure time. An accelerated object looks blurrier in the current frame than in the previous reference frame while a decelerated object appears sharper. The changing extent of blur between successive frames generally enlarges the prediction error. Thus it results in reduced compression efficiency and consequently in an increased data rate for the residual of inter-predicted blocks.

In this context, it is known to reduce the prediction error by filtering the reference frame for varying motion blur compensation. For example, it is known to predefine a plurality of blurring filters and to apply these blurring filters to a reference frame stored in the frame buffer 106. By iteratively testing the performance of each filter in terms of rate distortion optimization, the best blur filter is selected by the video coder. For allowing the video decoder to decode the generated bit stream, the blurring filter that has been selected by the video coder is signaled to the decoder as side information within the bit stream.

Nevertheless, even if such a technique can lead to a reduction of the prediction error in case of a blur variation between a reference frame and a current frame being inter coded, the signaling of the selected blurring filter from the video coder to the video decoder requires additional bits within the encoded bit stream. This additional signaling in turn decreases the number of bits that can be used for encoding the prediction error in the encoded bit stream.

SUMMARY

Having recognized the above-mentioned disadvantages and problems, the present disclosure aims to improve the state of the art. In particular, an object of the present disclosure is to provide a video coder, a coding method, a video decoder, and a decoding method for an improved coding and decoding of a video stream of subsequent frames.

The present disclosure particularly intends to improve the quality of the inter predictive coding by improving the accuracy of a prediction signal. The disclosure also intends to reduce the number of signaling bits within the encoded bit stream.

The above-mentioned object of the present disclosure is achieved by the solution provided in the enclosed independent claims. Advantageous implementations of the present disclosure are further defined in the respective dependent claims.

A first aspect of the present disclosure provides a video coder for predictive coding a video stream of subsequent frames according to motion compensation into an encoded video bit stream. The video coder comprises a frame buffer adapted to store at least one reference frame of the video stream, said reference frame being different from a current frame of the video stream. The video coder comprises a motion estimation unit adapted to generate a motion vector by estimating motion between a reference block of the reference frame and a current block of the current frame. The video coder comprises a filter selection unit adapted to select one of a plurality of filters depending on the orientation of the motion vector. The video coder comprises a filtering unit adapted to generate a filtered reference block by applying the selected filter to the reference block. The video coder comprises a motion compensation unit adapted to generate a filtered prediction block of the current block on the basis of the current block and the filtered reference block.

Thereby, while the prior art requires additional information to be coded in the bit stream for a video stream of subsequent frames, the present disclosure makes use of the motion vector, which is already part of the bit stream for the inter-prediction support. Therefore, no additional signalling is necessary for supporting the filtering of the reference frame/block. In the following, the features "frame" and "block" are interchangeable since the filtering and the prediction can be applied to a block of a frame or even to the frame itself.

In a first implementation form of the video coder according to the first aspect, the motion compensation unit is adapted to further generate a non-filtered prediction block of the current block on the basis of the current block and the reference block, and to output, from among the filtered prediction block and the non-filtered prediction block, the prediction block that minimizes a prediction error, said prediction error being the difference between the current block and the respective prediction block.

Thereby, a rate distortion optimization can be done so that the filtered or the non-filtered reference block is used for generating the encoded prediction error.

In a further implementation form of the video coder according to the first aspect, the motion estimation unit is adapted to generate a second motion vector by estimating motion between the filtered reference block and the current block. Depending on a comparison of the second motion vector and of motion vector between the reference block and the current block, the filtered reference block is taken into consideration or disregarded for generating the encoded video bit stream.

Thereby, the prediction of a block can be more accurate by the assessment of a second motion estimation.

In a further implementation form of the video coder according to the first aspect, the video coder comprises encoding means adapted to generate the encoded video bit stream on the basis of the prediction error corresponding to the prediction block outputted by the motion compensation unit.

Thereby, the efficient predictive coding can be implemented.

In a further implementation form of the video coder according to the first aspect, the video coder comprises encoding means adapted to generate the encoded video bit stream so that the encoded video bit stream comprises motion information and filter information. The motion information comprises the motion vector, and the filter information specifies whether the encoded video bit stream is based on the prediction error between the current block and the filtered prediction block or on the prediction error between the current block and the non-filtered prediction block.

Thereby, the filter information allows for the video decoder to rapidly determine whether or not the additional filtering of the reference block has to be done for performing the predictive decoding.

In a further implementation form of the video coder according to the first aspect, the encoding means are adapted to add in the encoded video bit stream the filter information at a block level for each predictive coded current block, at a frame level, at a Group of Pictures (GOP) level, at a Picture Parameter Set (PPS) level or at a Sequence Parameter Set (SPS) level.

Thereby, it is possible to adaptively set the filter information to a desired granularity so that the signalling can be optimized.

In a further implementation form of the video coder according to the first aspect, the video coder comprises a transforming and quantizing unit adapted to transform the prediction error by means of a linear spatial transform so as to generate transform coefficients, and to quantize the transform coefficients, and a scanning unit and an entropy encoder respectively adapted to scan and entropy code the quantized transform coefficients so as to generate the encoded video bit stream.

Thereby, the number of bits for transmitting the prediction error in the video bit stream can be further reduced.

In a further implementation form of the video coder according to the first aspect, the filter selection unit is adapted to derive the angle of the motion vector with respect to the positive horizontal axis, and to select said one of a plurality of filters depending on the angle.

Thereby, the selection of a filter to be applied to the reference block is simplified and can be performed without any further signalling bits.

In a further implementation form of the video coder according to the first aspect, the video coder is a video coder for single-layer coding of the video stream.

In a further implementation form of the video coder according to the first aspect, the filter selection unit is adapted to select one of a plurality of blurring and/or deblurring filters depending on the orientation of the motion vector.

Thereby, it is possible to add or remove blur from the reference block in cases of motion acceleration or deceleration within the video stream.

A further aspect of the present disclosure provides a hybrid video encoder for intra- and inter-frame prediction comprising such a video coder.

A further aspect of the present disclosure provides a method for predictive coding a video stream of subsequent frames according to motion compensation into an encoded video bit stream. The method comprises: a step of storing at least one reference frame of the video stream, said reference frame being different from a current frame of the video stream, a motion estimation step comprising generating a motion vector by estimating motion between a reference block of the reference frame and a current block of the current frame, a step of selecting one of a plurality of filters depending on the orientation of the motion vector, a step of generating a filtered reference block by applying the selected filter to the reference block, a motion compensation step comprising generating a filtered prediction block of the current block on the basis of the current block and the filtered reference block.

A further aspect of the present disclosure provides a video decoder for decoding an encoded video bit stream obtained by predictive coding a video stream of subsequent frames according to motion compensation, wherein the encoded video bit stream comprises a predictive encoded current frame and an encoded motion vector reflecting motion between a reference block of the reference frame and a current block of the current frame, said reference frame being different from the current frame. The video decoder comprises a decoder adapted to decode the encoded reference frame and the encoded motion vector so as to generate a reference frame and a motion vector, a frame buffer adapted to store the reference frame, a filter selection unit adapted to select one of a plurality of filters depending on the orientation of the motion vector, a filtering unit adapted to generate a filtered reference block by applying the selected filter to the reference block, a motion compensation unit adapted to generate the current block of the predictive encoded current frame on the basis of the motion vector and the filtered reference block.

Thereby, while the prior art requires additional information to be coded in the bit stream for a video stream of subsequent frames, the present disclosure makes use of the motion vector, which is already part of the bit stream for the inter-prediction support. Therefore, no additional signalling is necessary for supporting the filtering of the reference frame/block. Also, no information beyond the current frame is needed to select the filter and apply the selected filter to the reference frame/block.

In an implementation form of the video decoder according to the further aspect, the encoded video bit stream comprises a filter information related to the current block. The decoder is adapted to decode the filter information. The motion compensation unit is adapted to, depending on the value of the filter information, generate the current block of the predictive encoded current frame on the basis of the motion vector and the filtered reference block, or on the basis of the motion vector and the reference block, which corresponds to the non-filtered reference block i.e. to the reference block that has not been processed by the selected filter.

In an implementation form of the video decoder according to the further aspect, the filter selection unit is adapted to derive the angle of the motion vector such as with respect to the positive horizontal axis, and to select said one of a plurality of filters depending on the angle.

In an implementation form of the video decoder according to the further aspect, the video decoder is a video decoder for single-layer coding of the video stream.

In an implementation form of the video decoder according to the further aspect, the filter selection unit is adapted to select one of a plurality of blurring and/or deblurring filters depending on the orientation of the motion vector.

A further aspect of the present disclosure provides a hybrid video decoder for intra- and inter-frame prediction comprising such a video decoder.

A further aspect of the present disclosure provides a method for decoding an encoded video bit stream obtained by predictive coding a video stream of subsequent frames according to motion compensation. The encoded video bit stream comprises at least one encoded reference frame, a predictive encoded current frame, said reference frame being different from the current frame, and an encoded motion vector reflecting motion between a reference block of the reference frame and a current block of the current frame. The method comprises decoding the encoded reference frame and the encoded motion vector so as to generate a reference frame and a motion vector, storing the reference frame, selecting one of a plurality of filters depending on the orientation of the motion vector, generating a filtered reference block by applying the selected filter to the reference block, motion compensation comprising generating the current block of the predictive encoded current frame on the basis of the motion vector and the filtered reference block.

A further aspect of the present disclosure provides a computer program having a program code for performing such a coding and/or decoding method when the computer program runs on a computing device.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be full formed by eternal entities not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above aspects and implementation forms of the present disclosure will be explained in the following description of specific embodiments in relation to the enclosed drawings, in which

FIG. 8 shows an embodiment of a filter according to the present disclosure.

FIG. 9 shows an embodiment of filter coefficients according to the present disclosure.

DETAILED DESCRIPTION OF EMBODIMENTS

Figure 3:
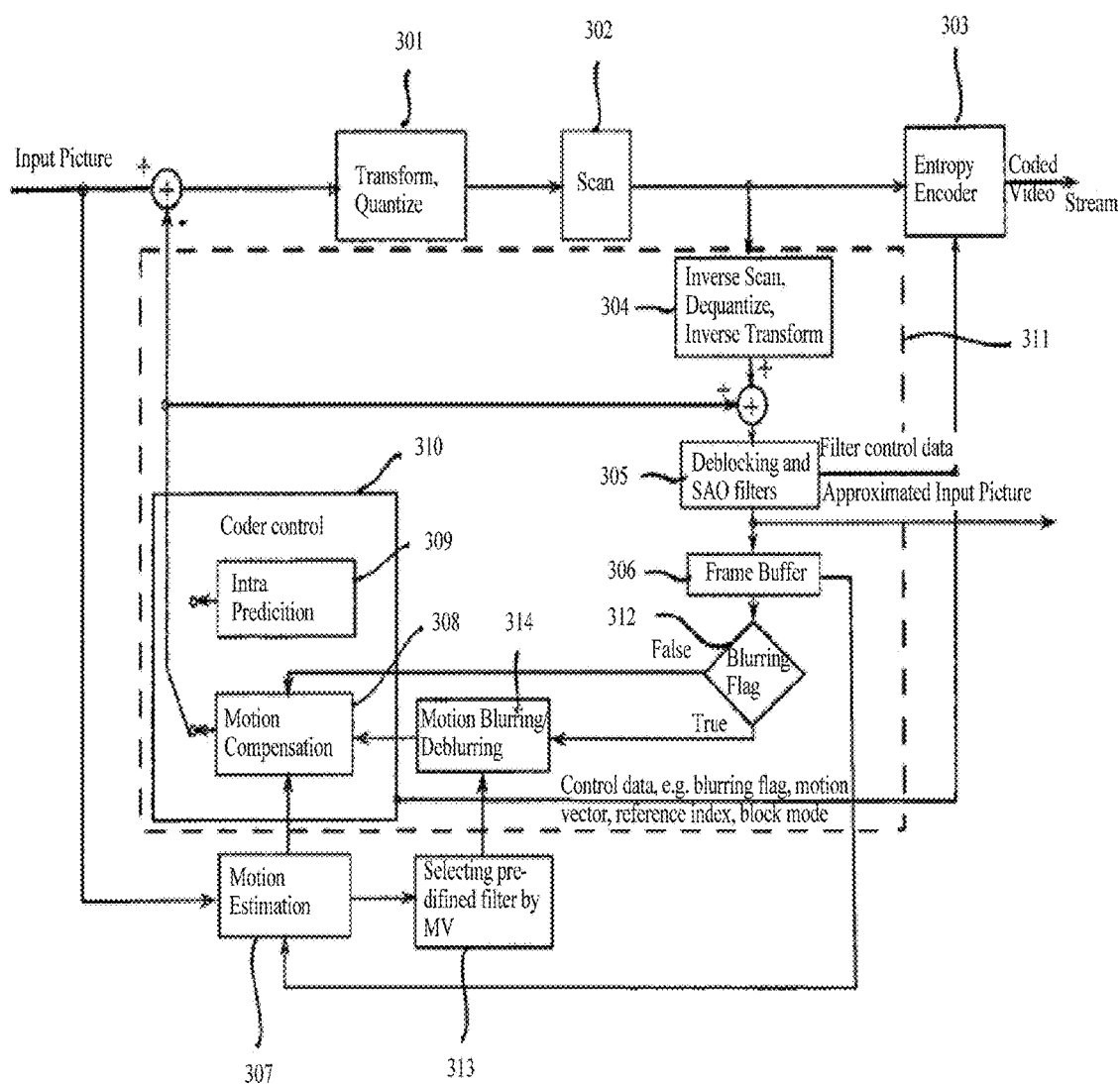
FIG. 3 shows a video coder according to an embodiment of the present disclosure.

FIG. 3 shows a video coder according to an embodiment of the present disclosure, and particularly a hybrid video coder 300 for predictive coding a video stream of subsequent frames according to motion compensation into an encoded video bit stream.

The video coder 300 comprises particularly a frame buffer 306, a motion estimation unit 307, a filter selection unit 313, a filtering unit 314 and a motion compensation unit 308.

The frame buffer 306 is adapted to store at least one reference frame of the video stream. Said reference frame is different from a current frame of the video stream. In the context of the disclosure, the current frame is a frame of the video stream that is currently encoded. The current frame is encoded using an inter coding technique, i.e. the current frame is predicted from one or a plurality of reference frames. The reference frame can be a previous frame, i.e. a frame that is located prior to the current frame within the video stream of subsequent frames. Alternatively if forward prediction is used, the reference frame can be a future frame, i.e. a frame that is located after the current frame. In case of a plurality of reference frames, at least one can be a previous frame and at least one of them can be a future frame. A reference frame can be intra coded, i.e. can be coded without using any further frame and without any dependence on other frames, so that it can be independently decoded and it can serve as entry point for random video access.

The motion estimation unit 307 is adapted to generate a motion vector by estimating motion between a reference block of the reference frame and a current block of the current frame. FIG. 3 accordingly shows that the motion estimation unit 307 comprises an input for the reference frame stored in the frame buffer 306, and an input for an input picture that corresponds to the current frame.

The motion vector is generated by using a block motion estimation. The reference block and the current block are preferably a respective area or sub-area of the reference frame and the current frame. Such a block may have a regular, rectangular shape or an irregular shape. Alternatively, the blocks can have the same size as the frames. Both the current block and the reference block have the same size. The size of the blocks is defined by means of a block mode. A block can correspond to a coding unit (CU) that is a basic coding structure of the video sequence of a pre-defined size, containing a part of a frame, e.g. 64×64 pixels.

The current block of the current frame being inter coded is predicted from the reference block of the reference frame. The encoding process for the inter frame prediction comprises choosing motion data that comprise a reference index and the motion vector to be applied for predicting the current block. The reference index is a index of the reference block and/or of the reference frame.

The filter selection unit 313 is adapted to select one of a plurality of filters depending on the orientation of the motion vector. The filtering unit 314 is adapted to generate a filtered reference block by applying the selected filter to the reference block. The motion compensation unit 308 is adapted to generate a filtered prediction block of the current block on the basis of the current block and the filtered reference block.

FIG. 3 shows accordingly that the motion estimation unit 307 transmits the motion vector to the filter selection unit 313. The output of the filter selection unit 313 identifies the selected filter. The filtering unit 314 then applies the filter selected by the filter selection unit 313 to the reference block of the reference frame stored in the frame buffer 306, so as to generate a filtered reference block transmitted to the motion compensation unit 308. The motion compensation unit 308 then generates the filtered prediction block on the basis of the current block of the current frame and the filtered reference block. Preferably, the filtered prediction block is generated on the basis of the current block, the motion vector, and the filtered reference block.

Particularly, for the hybrid video coding, said motion estimation 307 is performed during encoding to find the motion vector pointing to the best prediction unit in a reference frame. Motion compensation 308 uses motion data, which are coded and transmitted as side information to the decoder, to generate prediction signals. The prediction signals refer to prediction blocks that can be combined to obtain a prediction frame.

Figure 1:
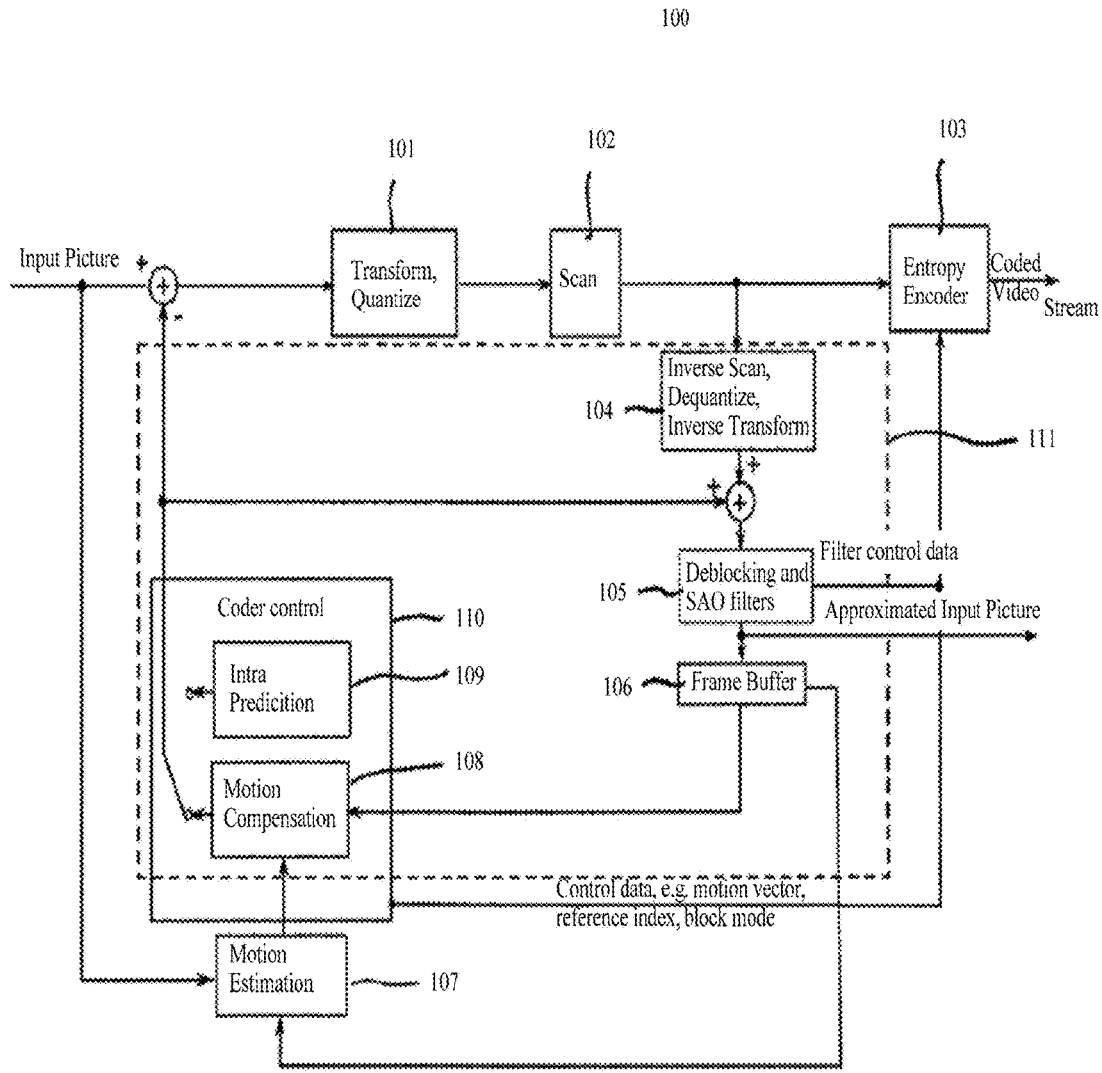
FIG. 1 shows a video coder according to the state of the art.
Figure 2:
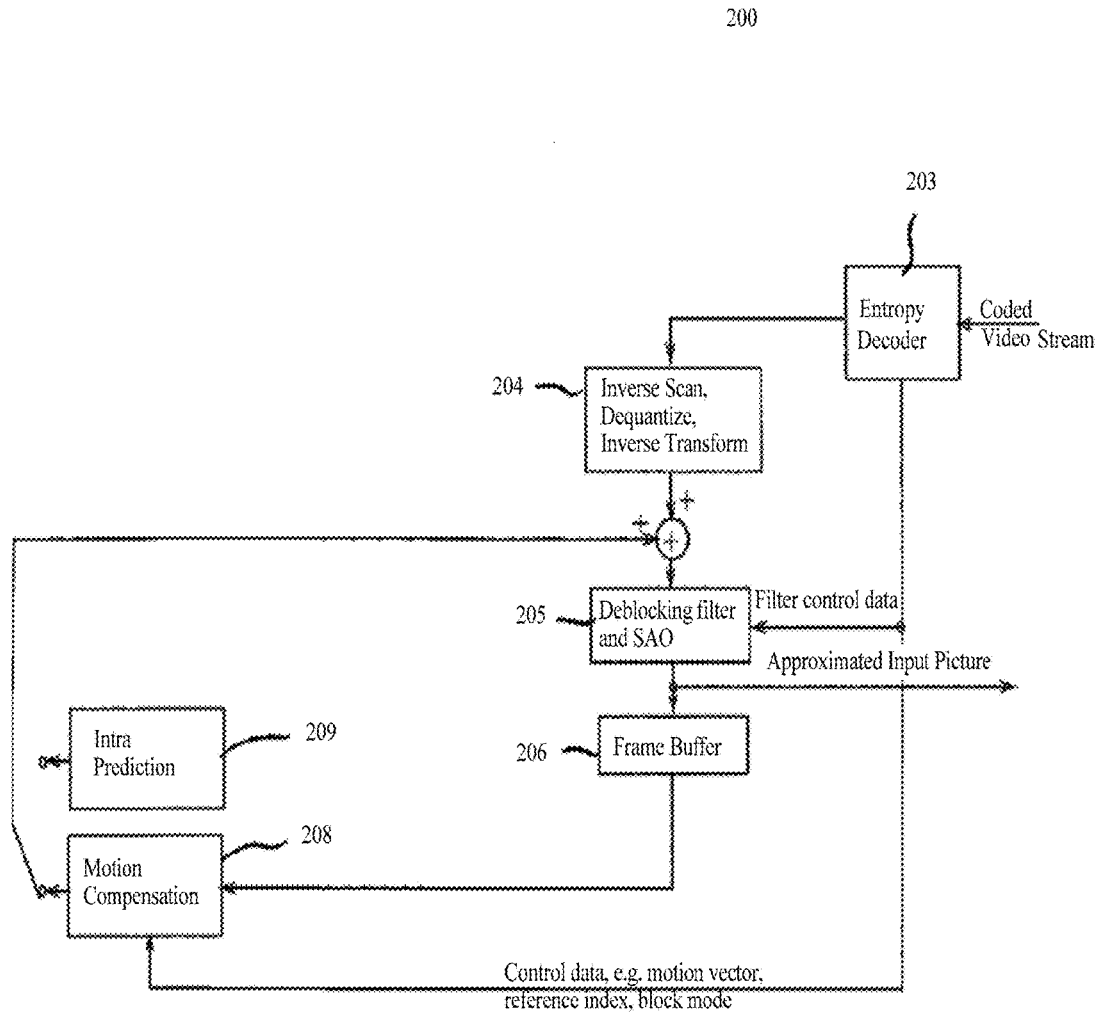
FIG. 2 shows a video decoder according to the state of the art.

The video coder 300 of FIG. 3 comprises further units similarly to the video coder 100 of FIG. 1. Particularly, the video coder 300 comprises similar units that are a transform and quantize unit 301, a scan unit 302, an entropy encoder 103, an inverse scan, dequantize, inverse transform unit 304, a deblocking and SAO filters unit 305. The video coder 300 comprises further similar units that are the motion estimation unit 307, the motion compensation unit 308, the intra prediction 309 that is responsible for the intra prediction of for example the reference frame, and the coder control 310.

In the hybrid video coder 300 shown in FIG. 3, based on the motion vector generated during motion estimation 307 for e.g. a block or coding unit, a pre-defined filter is selected 313 according to the orientation of said motion vector, and particularly according to the angle of said motion vector with respect to the horizontal axis. The angle is calculated based on the motion vector of the current block. Then, the selected filter is applied to the reference frame stored in the frame buffer 306.

In the video encoder 300, the motion compensation unit 308 is adapted to further generate a non-filtered prediction block of the current block on the basis of the current block and the reference block, and particularly on the basis of the current block, the motion vector and the reference block. The reference block taken into consideration here is the non-filtered reference block of the reference frame stored in the frame buffer 306. The motion compensation unit 308 is moreover adapted to output, from among the filtered prediction block and the non-filtered prediction block, the prediction block that minimizes a prediction error, said prediction error being the difference between the current block and the respective prediction block.

This means that the rate distortion performance of the filtered prediction block and of the non-filtered prediction block will be compared. The option which presents the better rate distortion performance is then chosen. This comparison and this choice can be carried out by the coder control 310. The coder control 310 can select the motion information, such as motion vector and reference index, and the filter information like the blurring flag, based on the rate distortion optimization procedure.

The entropy encoder 303 is adapted to generate the encoded video bit stream so that the encoded video bit stream comprises motion information and filter information. The motion information comprises the motion vector selected by the unit, and advantageously also the reference index that is an index to identify the reference block and/or reference frame used for predictive coding of the current block and/or current frame. The filter information specifies whether the encoded video bit stream is based on the prediction error between the current block and the filtered prediction block or on the prediction error between the current block and the non-filtered prediction block. Particularly, the filter information specifies whether the encoded bit stream has been generated based on the filtered prediction block and the non-filtered prediction block.

The filter selection unit 313 is adapted to select one of a plurality of blurring or deblurring filters depending on the orientation of the motion vector. The filters can be pre-determined filters that reside on both the coder 300 and a corresponding decoder as the decoder 400 shown in FIG. 4. Alternatively, the definition of the filters can be transmitted from the coder 300 to the decoder 400 by corresponding filter signalling in the bit stream. This means that either fixed filters are used for all video sequences, such that there is no need to send the pre-defined filters, or customized filters are defined for e.g. difference categories of videos. In the latter case, the filters can be sent through an SEI (supplemental enhancement information) message to the decoder.

The filter information transmitted within the bit stream can be a filter flag. For example, a blurring flag can be defined for each block which has been coded with inter prediction i.e. according to an inter mode. The flag at block level can be used to indicate whether a blurring or deblurring filter has been used for a current block. In addition, a blurring flag added in a slice header can be used to indicate whether a blurring/deblurring filter has been used for the current slice. Such a flag in SPS (sequence parameter set) can be used to indicate whether blurring/deblurring filter has been used for a coded video sequence. Such a flag in PPS (picture parameter set) can be used to indicate whether blurring/deblurring filter has been used for a coded picture. Alternatively, the blurring flag can be used for indicating whether a blurring filter has been used for the current block and a deblurring flag can be used for indicating whether a deblurring filter has been used for the current block.

In addition to the known standard coding methods that are intra-frame and inter-frame prediction (incl. skip), the present disclosure proposes a further mode that is the motion blur compensation mode for hybrid video coding. This motion blur compensation can be considered as a complement of inter mode (incl. skip) of hybrid video coding, such as High Efficiency Video Coding (HEVC), during the coding of a certain block. The disclosure proposes to create temporal reference frames by filtering 314 the reconstructed frame stored in the frame buffer 306 with a filter of angle θ that is derived from the motion vector obtained by the motion estimation 307.

These filtered reference frames and/or reference blocks are then used for motion blur compensation. In case the blurring filter is applied to the reference frame, the filtered reference frame and the original reference frame stored in the frame buffer 306 share the same reference index. Namely, a reference index will refer to either a reconstructed frame in the general motion estimation in hybrid video coding, or a blurred temporal frame used for the motion estimation of the proposed motion blur compensation.

The motion estimation of the motion blur compensation according to the present disclosure is executed after the traditional motion estimation of hybrid video coding, such as motion estimation in HEVC.

The blurring flag can be defined for each block or coding unit that is coded with inter mode (incl. skip) for all partition sizes (2N×2N, 2N×N, 2N×Nu, 2N×Nd, . . . ). The decoder 400 is able to determine whether the reference frame is blurred during reconstruction of a coding unit (CU) and to replicate the blurring of reference frame using the angle θ derived from the encoded motion vector (MV). The blurring flag is considered within the rate distortion (RD) optimization.

The flag at block or coding unit level can be used to indicate whether a blurring/deblurring filter has been used for a coding unit. In addition thereto, a flag in SPS can be used to indicate whether blurring/deblurring filter has been used for a coded video sequence. A flag in PPS can also be used to indicate whether blurring/deblurring filter has been used for a coded picture.

Figure 4:
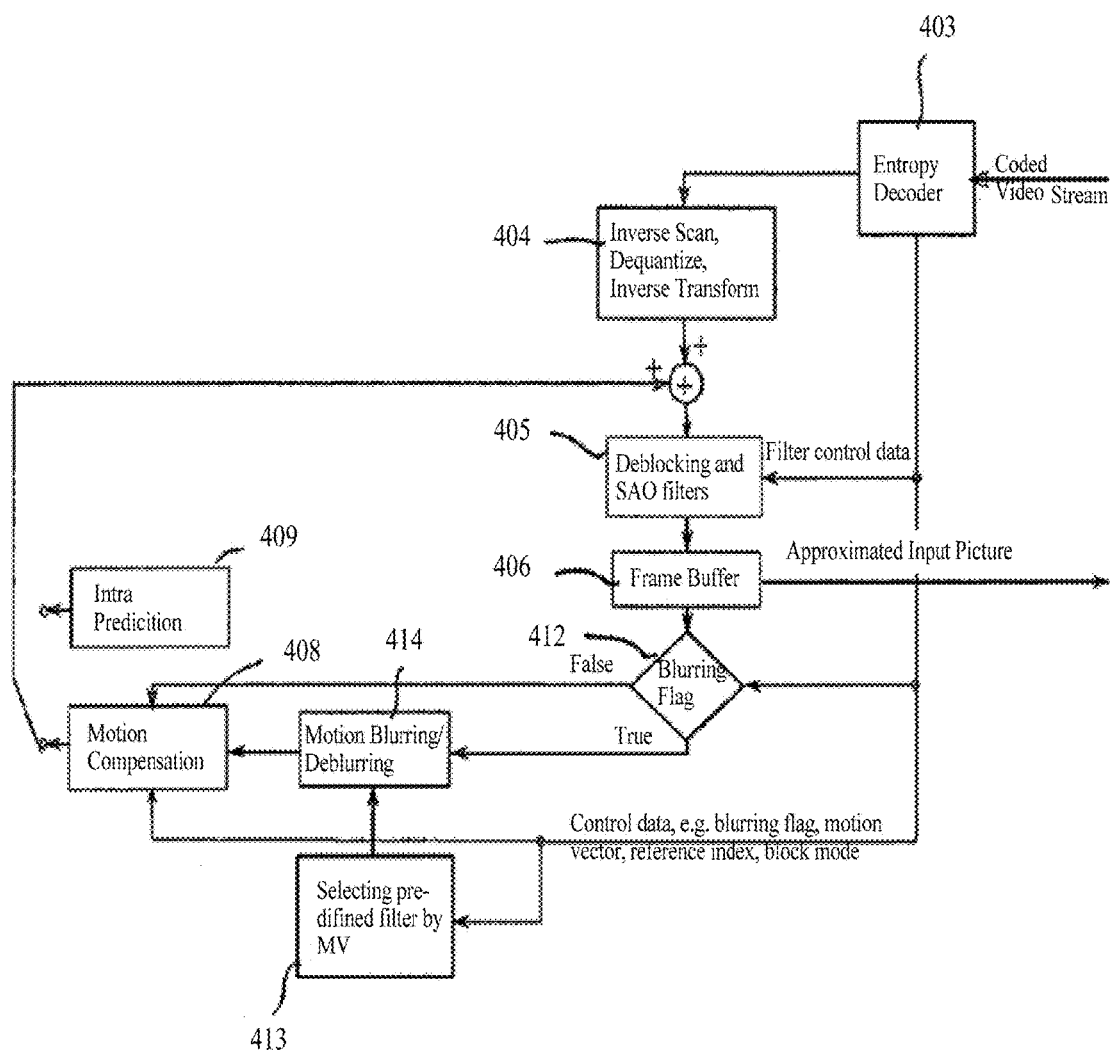
FIG. 4 shows a video decoder according to an embodiment of the present disclosure.

FIG. 4 shows a video decoder according to an embodiment of the present disclosure. This video decoder 400 corresponds to the video coder 300 in that it comprises the elements of the video coder 300 located in the dashed box 311 in FIG. 3. The decoder 400 is adapted to decode the bit stream generated by the video coder 300, and both the decoder 400 and the coder generate identical predictions.

The video decoder 400 is a decoder for decoding an encoded video bit stream obtained by predictive coding a video stream of subsequent frames according to motion compensation. The encoded video bit stream comprises a predictive encoded current frame, which corresponds to the prediction error, and an encoded motion vector reflecting motion between a reference block of the reference frame and a current block of the current frame, said reference frame being different from the current frame.

The video decoder 400 comprises a decoder 403, a frame buffer 406, a filter selection unit 413, a filtering unit 414, and a motion compensation unit 408. The decoder 403 is adapted to decode the encoded reference frame and the encoded motion vector so as to generate a reference frame and a motion vector. The frame buffer 406 is adapted to store the reference frame. The filter selection unit 413 is adapted to select one of a plurality of filters depending on the orientation of the motion vector. The filtering unit 414 is adapted to generate a filtered reference block by applying the selected filter to the reference block. The motion compensation unit 408 is adapted to generate the current block of the predictive encoded current frame on the basis of the motion vector and the filtered reference block.

Further on, the encoded video bit stream comprises a filter information related to the current block. The decoder 403 is adapted to decode the filter information, and the motion compensation unit 408 is adapted to, depending on the value of the filter information, generate the current block of the predictive encoded current frame on the basis of the motion vector and the filtered reference block, or on the basis of the motion vector and the reference block. Said reference block in fact corresponds to the non-filtered reference block i.e. to the reference block that has not been processed by the selected filter.

The filter selection unit 413 is adapted to derive the angle of the motion vector with respect to the positive horizontal axis, and to select said one of a plurality of filters depending on the angle.

FIG. 4 shows that the coded video stream, i.e. the bit stream, is fed to the entropy decoder 403 that decodes the reference frame and the prediction error for the current block/frame via the inverse scan, dequantize, inverse transform unit 404 and the deblocking and SAO filters 405. The reference frame is stored in the frame buffer 406. On the other hand, the decoder 403 transmits the motion information and filter information, which comprise respectively the motion vector and the blurring/deblurring flag, to the filter selection unit 413 and to the motion compensation unit 408.

Filter information, such as the blurring/deblurring flag, can be defined for each block or coding unit which has been coded with inter mode (incl. skip) for all partition sizes including e.g. 2N×2N, 2N×N, 2N×Nu, 2N×Nd, . . . . The blurring/deblurring flag might be present in slice header, PPS or SPS. The decoder 400 is able to determine whether the reference frame is blurred during reconstruction of a block and to replicate the blurring of reference frame using the angle θ derived from the encoded motion vector. In order to make sure that decoded frames in the decoder 400 are identical to the reconstructed ones, the same filter is applied to the current block by the decoder 400 and by the coder 300, the filter being determined by using the orientation of the decoded motion vector. Then motion blurring filter is applied to the reference frame/block. Motion compensation utilizes the blurring filtered signal depending on the filter information, and particularly if the blurring/deblurring flag indicates that a filter, e.g. blurring filter, has been applied in the encoder 300.

Two embodiments of the proposed motion compensation i.e. motion blur compensation at the encoder are explained in the followings.

Figures 5A, 5B:
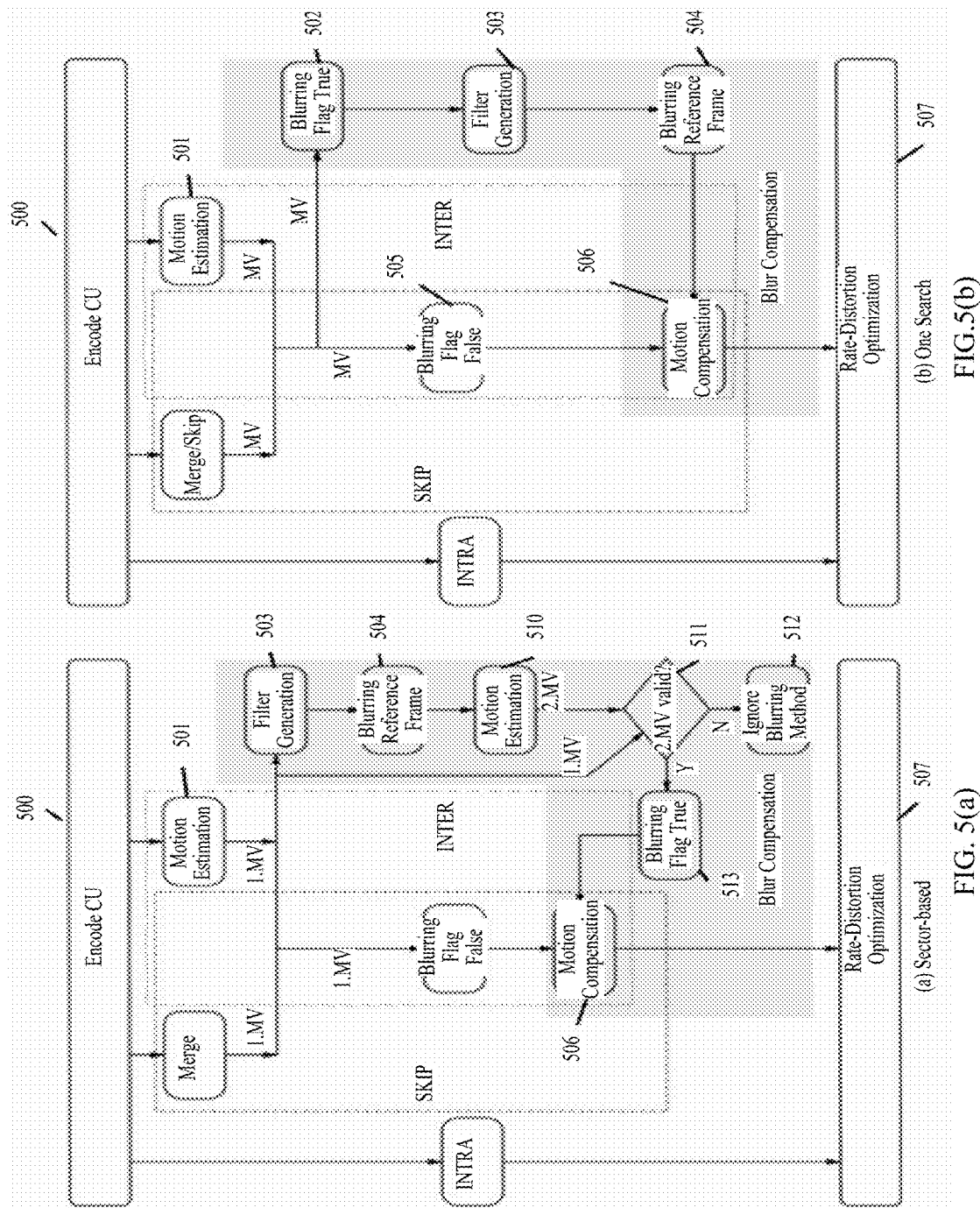
FIG. 5(a) shows an embodiment of motion blur compensation according to the present disclosure.
FIG. 5(b) shows an embodiment of motion blur compensation according to the present disclosure.

FIG. 5(b) shows an embodiment of motion blur compensation according to the present disclosure. This embodiment comprises one motion estimation in that, when encoding 500 the current block or coding unit (CU), a motion estimation 501 is performed by the motion estimation unit 307 to generate a motion vector by estimating the motion between the reference block and the current block. During a filter generation 503, the filter selection unit 313 selects the filter corresponding to the orientation of the motion vector, i.e. to the angle θ of the motion vector with respect to e.g. the horizontal. The range [0, π] for the angle θ is subdivided into sub-ranges [0, $\theta_1$], [$\theta_1$, $\theta_2$] . . . [$\theta_{n-1}$, $\theta_n$], [$\theta_n$, π], with n being an integer value, and each sub-range is associated with one pre-defined filter.

Once the filter is generated or selected, this filter is applied to the reference block or frame for generating a filtered reference block/frame like e.g. a blurred reference block/frame 504. FIG. 5(b) shows that the filtered reference block/frame is generated for a filter flag, i.e. a blurring flag, being true 502, while the reference block/frame is not filtered for a filter flag, i.e. a blurring flag, being false 505. The motion compensation 506 is applied to both the filtered reference block/frame and to the non-filtered reference block/frame. Based on a following rate distortion optimization 507, it is decided if the filtered or the non-filtered reference block is used for generating the prediction error.

FIG. 5(a) shows a further embodiment of motion blur compensation according to the present disclosure. In contrast to the embodiment of FIG. 5(b), the blurred reference block/frame 504 is not sent to the motion compensation 506 but is used for carrying out a second motion estimation.

Accordingly, the motion estimation unit 307 is adapted to carry out a second motion estimation 510 on the basis of the filtered reference block 504, and thus to generate a second motion vector by estimating motion between the filtered reference block 504 and the current block. A comparison 511 is then carried out between the second motion vector generated by the second motion estimation 510, and the first motion vector, generated by the first motion estimation 501, between the reference block and the current block. Depending on this comparison 511, the filtered reference block is taken into consideration or disregarded for generating the encoded video bit stream.

So, the embodiment of FIG. 5(a) comprises two rounds of motion estimation 501, 510, the second motion estimation 510 being performed based on the filtered reference block/frame. The filtering/blurring method is thereby ignored 512 in case the first and second motion vectors are not located in the same defined angular sector according to a sector-based algorithm.

During the coding 501 of a certain block or coding unit, one element of the sector-based algorithm in the encoding process is the validation check of the predicted motion vector, which corresponds to the second motion vector, after a second motion estimation 510 is made based on the filtered/blurred reference block/frame.

The validation check has following three criteria:
1) the first motion vector and second motion vector are in same sector.
2) the second motion vector is non-zero vector.
3) the motion vector is inside defined search range, i.e. ±64 in horizontal and vertical directions.

Figure 6:
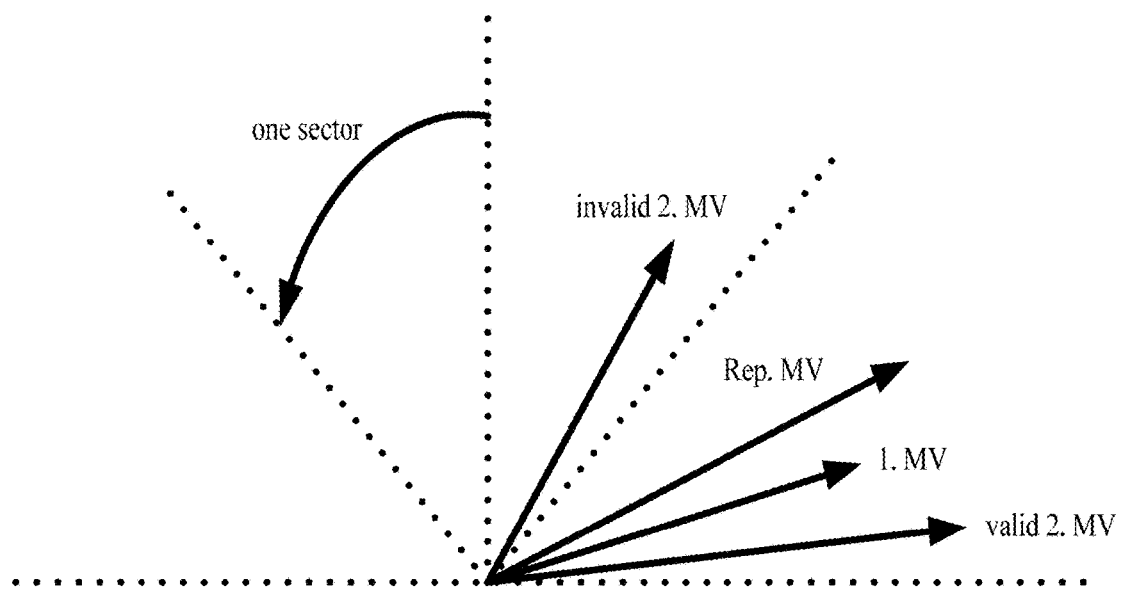
FIG. 6 shows examples of motion vectors obtained by the embodiment of FIG. 5(a).

FIG. 6 shows examples of motion vectors obtained by the embodiment of FIG. 5(a) using the sector-based algorithm. FIG. 6 shows four different angular sectors being [0, π/4], [π/4, π/2], [π/2, 3π/4], and [3π/4, π]. The first motion vector obtained by the first motion estimation 501 is labeled "1. MV" and is located in the first sector.

According to a first example, the second motion estimation 510 is then applied and results in a second motion vector labeled "valid 2. MV". Since the second motion vector is located in the same sector as the first motion vector, the blurring flag is true 513. This means that a motion compensation based on the filtered reference block is possible. In this case, a motion compensation 506 is performed for both the filtered reference block and the non-filtered reference block from the frame buffer. A following rate distortion optimization is carried out to select either the filtered or the non-filtered version.

According to a second example, the second motion vector labeled "invalid 2. MV" is located in a different sector than the sector of the first motion vector. As a consequence, the filtering is ignored 512 and a motion compensation is applied only for the non-filtered reference block.

In other words, after the blurring operation 504, the blurring flag is only set to true 513 in case the first motion vector and second motion vector are located in the same defined sector. Otherwise, the blurring flag is set to false 512. In contrast, in the embodiment of FIG. 5(b) no second round motion estimation is needed. The blurring flag is set to true 502 if blurring 504 is performed. These embodiments are coder-related embodiments on how to decide whether blurring filter should be used.

Coming back to the embodiment of FIG. 5(a), the first criterion preferably means that a representative direction is defined for each predefined sector. The representative direction preferably lies at the middle of the sector. For example, FIG. 6 shows the representative direction for the first sector, said direction being labeled "Rep. MV". The blurring filters are generated based on those representative directions. The number of sectors can be given according to different requirement of accuracy and the same number of corresponding blurring filters is calculated before coding starts.

If the first and second motion vectors belong to the same sector, the same representative direction as well as the same blurring filter is used by encoder and decoder. The decoder only has to find out the direction carried by the transmitted motion vector and does the exact filtering to have the same reconstructed block or coding unit.

In the example of FIG. 6, each filter covers an angle of $\pi/4=45°$ if the number of four sectors is chosen. Since the first motion vector falls in first sector, the representative motion vector points to the direction in the middle of the sector. If the second motion vector "valid 2. MV" falls in the same sector, the value true is given by the validation check and the decoder finds the same representative motion vector.

Preferably, the second motion vector is then transmitted to the decoder. This means that the video coder comprises encoding means 303 adapted to generate the encoded video bit stream so that the encoded video bit stream comprises motion information, wherein the motion information comprises the second motion vector.

If the second motion vector "invalid 2. MV" leads to another representative motion vector for the second vector, the value false will be given by the validation check.

Advantageously, a second criterion consists in that the second motion vector is a non-zero vector. This criterion is based on the fact that motion blur occurs if there is a relative motion between objects and cameras during exposure. A zero motion vector means that no motion is found for the block or coding unit, thus there should be no blur and the validation check gives false as a result. No filter is then applied 314 to the reference block. This second criterion can be considered in addition to the first criterion or alone.

Finally, according to the third criterion, the second motion vector should be in the search range of motion estimation for the validation check to be true. This third criterion can be considered in addition to the first and/or second criterion.

With the rise of the number of sectors, the direction of blurring will be more accurate while the validation rate of the second motion vector decreases, which may lead to a drop in the coding gain and efficiency. There is hence a trade-off between filter accuracy and validation rate.

Compared to the embodiment of FIG. 5(a), the encoding structure of the embodiment of FIG. 5(b) is simplified by applying the same motion vector to motion compensation (MC) based on filtered reference instead of a second motion estimation and a validation check based on sector. The embodiment of FIG. 5(b) thus can reduce the run time. Indeed this embodiment spares not only one additional motion estimation, but also the region of blurring. In place of blurring the whole area covered by standard motion estimation, it is only requested to blur the block or coding unit on the reference frame pointed by the motion vector and its surrounding which will be used by interpolation later. For the same reason as above in the embodiment of FIG. 5(a), also here a zero motion vector is excluded from motion blur compensation.

The embodiment of FIG. 5(a) introduces a second motion estimation on filtered reference frames and a sector-based validation check to make sure that encoder and decoder share an identical blurring direction. In the embodiment of FIG. 5(a), the prediction of a block or coding unit becomes more accurate with an increase of the number of filters, i.e. with an increased number of sectors, since the generated filters are more precise in directions. On the other hand, a higher number of filters means that the range of valid angles for the second motion vector decreases and the motion blur compensation is ignored more often. The use of 9 filters is a good compromise.

In the followings, an embodiment of blurring filters that can be used for motion blur compensation will be shown.

A commonly used linear uniform motion blur point spread function (PSF) in continuous time domain is described with a line segment L and an angle $\theta$ with respect to the horizontal axis, as given in the following formula:

$$h(x, y) = \begin{cases} \frac{1}{L}, & \sqrt{x^2 + y^2} \leq \frac{L}{2}, \frac{y}{x} = \tan\theta \\ 0, & \text{otherwise} \end{cases} \quad (1)$$

wherein L is proportional to motion speed and exposure duration, $\theta$ indicates the motion direction and (x,y) is the location in Cartesian coordinate system. This function is e.g. known from "Photo consistent motion blur modeling for realistic image synthesis", H. Lin and C. Chang, PSIVT 2006.

Figure 7:
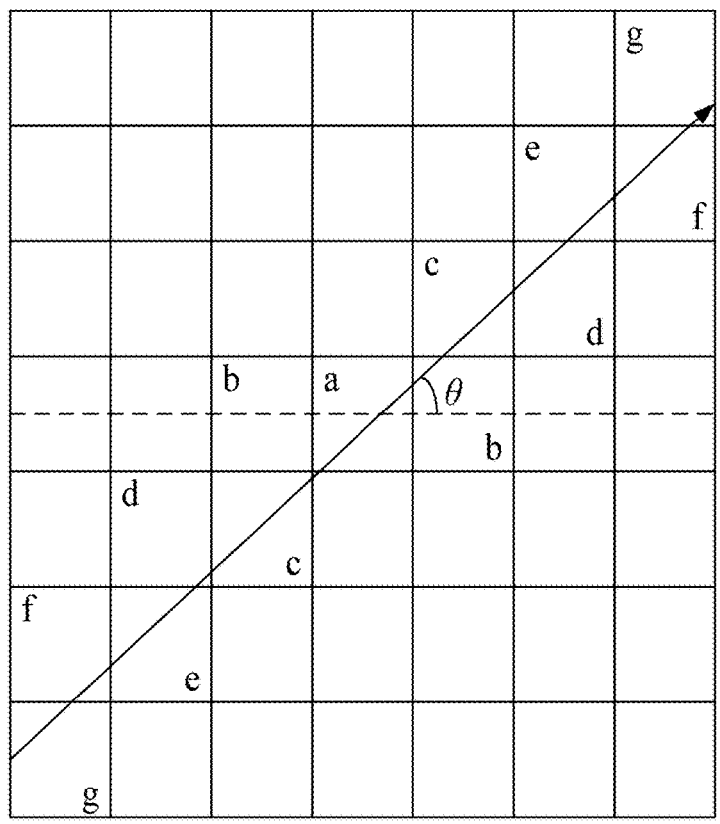
FIG. 7 shows an embodiment of a filter according to the present disclosure.

The discrete version of equation (1) is acquired by considering a bright spot traversing across the sensors covered by the line segment during the exposure time with constant velocity, as known from "Parametric Blur Estimation for Blind Restoration of Natural Images: Linear Motion and Out-of-Focus", J. Oliveira, M. Figueiredo, and J. Bioucas-Dias, Image Processing, IEEE Transactions on Image Processing, 2014. Each coefficient of the blur kernel is proportional to the time spent on each sensor element. With the assumption of a constant motion, the filter coefficients are given by the normalized length of the intersection of the line segment with each pixel in the grid, as illustrated by FIG. 7. Said FIG. 7 shows a discrete version of linear motion blur with $\theta=\arctan 4/5$.

In case of varying motion blur, a filtered reference may improve the coding performance. It is assumed that motion blur as well as the change of motion blur can be described by equation (1). Motion can be considered constant for the exposure time of a single frame. Since the time interval between two nearby frames is only 0.02 seconds for a 50 fps video sequence, we suggest that the change of motion blur extent is small in most cases. Therefore we employ a fixed extent of 3 pels to describe the phenomenon of variation in blurring, i.e., L=3. Hence the two dimensional blurring filter for the luminance component has a dimension of 3×3.

The other degree of freedom for a blurring filter is the angle $\theta$. It is derived from the motion vector used in hybrid video coding, such as HEVC. Hence a standard hybrid video coding motion search is executed before the blurring filter is established. The blurred reference frame is generated by using the directions of the motion vectors.

The general discrete version of the 3×3 filter has 5 different coefficients a, b, c, d and e due to symmetry and is calculated according to an arbitrary angle $\theta$ using FIG. 8. The suggested filter is a low-pass filter. As an example, filter coefficients for $\theta=15°$ and $\theta=60°$ are listed in FIG. 9.

In an embodiment, we will only blur the luminance component of the reference by using such a 3×3 filter if a test sequence has the 4:2:0 format. Chrominance pixels lie at every other pixel position of the luminance component [6]. With blur extent of only 3 pels, three neighboring luminance pixels but only 1 chrominance pixel have to be considered. A neighbored chrominance pixel is out of the influence range of blurring, hence no filter is required. In case of a sequence of 4:4:4 chroma subsampling, the same filter for luminance component will be applied for chrominance components.

The motion blur model proposed and the proposed blurring filter are examples. Other blurring filters can be apply according to the proposed disclosure as well, in which the motion vector of the current coding unit/block is used to select pre-defined filters for coding efficiency improvement in hybrid video coding.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation. Additionally, statements made herein characterizing the invention refer to an embodiment of the invention and not necessarily all embodiments.

What is claimed is:

1. A video coder device for predictive coding of a video stream of subsequent frames according to motion compensation into an encoded video bit stream, the video coder device comprising:
    a frame buffer adapted to store at least one reference frame of the video stream, the at least one reference frame being different from a current frame of the video stream; and
    a processor, configured to:
        generate a motion vector by estimating motion between a reference block of the at least one reference frame and a current block of the current frame;
        select one of a plurality of filters depending on the orientation of the motion vector;
        generate a filtered reference block by applying the selected filter to the reference block; and
        generate a filtered prediction block of the current block on the basis of the current block and the filtered reference block.

2. The video coder device according to claim 1, wherein the processor is further configured to:
    generate a non-filtered prediction block of the current block on the basis of the current block and the reference block; and
    output, from among the filtered prediction block and the non-filtered prediction block, the prediction block that minimizes a prediction error, the prediction error being the difference between the current block and the respective prediction block.

3. The video coder device according to claim 1, wherein the processor is further configured to generate a second motion vector by estimating motion between the filtered reference block and the current block; and
    wherein the processor is further configured to, depending on a comparison of the second motion vector and the motion vector between the reference block and the current block, take the filtered reference block into consideration or disregard the filtered reference block for generating the encoded video bit stream.

4. The video coder device according to claim 2, wherein the processor is further configured to generate the encoded video bit stream on the basis of the prediction error corresponding to the prediction block.

5. The video coder device according to claim 1, wherein the processor is further configured to generate the encoded video bit stream so that the encoded video bit stream comprises motion information and filter information;
    wherein the motion information comprises the motion vector; and
    wherein the filter information specifies whether the encoded video bit stream is based on the prediction error between the current block and the filtered prediction block or on the prediction error between the current block and the non-filtered prediction block.

6. The video coder device according to claim 5, wherein the processor is further configured to add in the encoded video bit stream the filter information at a block level for each predictive coded current block, at a frame level, at a GOP (group of pictures) level, at a PPS (picture parameter set) level or at an SPS (sequence parameter set) level.

7. The video coder device according to claim 4, wherein the processor is further configured to:
    transform the prediction error via a linear spatial transform so as to generate transform coefficients, and to quantize the transform coefficients; and
    scan and entropy code the quantized transform coefficients so as to generate the encoded video bit stream.

8. The video coder device according to claim 1, wherein the processor is further configured to derive the angle of the motion vector, and to select the one of the plurality of filters depending on the angle.

9. The video coder device according to claim 1, wherein the processor is further configured for single-layer coding of the video stream.

10. The video coder device according to claim 1, wherein the processor is further configured to select at least one of a plurality of blurring and deblurring filters depending on the orientation of the motion vector.

11. The video coder device according to claim 1, wherein the video coder device comprises a hybrid video encoder for intra- and inter-frame prediction.

12. A method for predictive coding aa video stream of subsequent frames according to motion compensation into an encoded video bit stream, the method comprising:
    storing at least one reference frame of the video stream, the at least one reference frame being different from a current frame of the video stream;
    generating a motion vector by estimating motion between a reference block of the at least one reference frame and a current block of the current frame;
    selecting one of a plurality of filters depending on the orientation of the motion vector;
    generating a filtered reference block by applying the selected filter to the reference block; and
    generating a filtered prediction block of the current block on the basis of the current block and the filtered reference block.

13. A video decoder device for decoding an encoded video bit stream obtained by predictive coding of a video stream of subsequent frames according to motion compensation, wherein the encoded video bit stream comprises an encoded reference frame, a predictive encoded current frame and an encoded motion vector reflecting motion between a reference block of a reference frame and a current block of a current frame, the reference frame being different from the current frame the video decoder device comprising:
    a processor, configured to decode the encoded reference frame and the encoded motion vector so as to generate the reference frame and a motion vector; and
    a frame buffer, configured to store the reference frame;
    wherein the processor is further configured to:

select one of a plurality of filters depending on the orientation of the motion vector;

generate a filtered reference block by applying the selected filter to the reference block; and generate the current block of the current frame on the basis of the motion vector and the filtered reference block.

14. The video decoder device according to claim 13, wherein the encoded video bit stream comprises filter information related to the current block;

wherein the processor is further configured to:

decode the filter information; and depending on the value of the filter information, generate the current block of the predictive encoded current frame on the basis of the motion vector and the filtered reference block, or on the basis of the motion vector and the reference block.

15. The video decoder device according to claim 13, wherein the processor is further configured to derive the angle of the motion vector, and to select the one of the plurality of filters depending on the angle.

16. The video decoder device according to claim 13, wherein the processor is further configured for single-layer coding of the video stream.

17. The video decoder device according to claim 13, wherein the processor is further configured to select at least one of a plurality of blurring and deblurring filters depending on the orientation of the motion vector.

18. The video decoder device according to claim 13, wherein the video decoder device comprises a hybrid video decoder for intra- and inter-frame prediction.

19. A method for decoding an encoded video bit stream obtained by predictive coding of a video stream of subsequent frames according to motion compensation, wherein the encoded video bit stream comprises at least one encoded reference frame, a predictive encoded current frame, and an encoded motion vector reflecting motion between a reference block of a reference frame and a current block of a current frame, wherein the reference frame is different from the current frame, the method comprising:

decoding the at least one encoded reference frame and the encoded motion vector so as to generate the reference frame and a motion vector;

storing the reference frame;

selecting one of a plurality of filters depending on the orientation of the motion vector;

generating a filtered reference block by applying the selected filter to the reference block; and generating the current block of the current frame on the basis of the motion vector and the filtered reference block.

20. A non-transitory computer readable medium having stored thereon computer-executable instructions that when executed by a processor facilitate the performance of operations for predictive coding of a video stream of subsequent frames according to motion compensation into an encoded video bit stream, the operations comprising:

storing at least one reference frame of the video stream, the at least one reference frame being different from a current frame of the video stream;

generating a motion vector by estimating motion between a reference block of the at least one reference frame and a current block of the current frame;

selecting one of a plurality of filters depending on the orientation of the motion vector;

generating a filtered reference block by applying the selected filter to the reference block; and generating a filtered prediction block of the current block on the basis of the current block and the filtered reference block.

21. A non-transitory computer readable medium having stored thereon computer-executable instructions that when executed by a processor facilitate the performance of operations for decoding an encoded video bit stream obtained by predictive coding of a video stream of subsequent frames according to motion compensation, wherein the encoded video bit stream comprises at least one encoded reference frame, a predictive encoded current frame, and an encoded motion vector reflecting motion between a reference block of a reference frame and a current block of a current frame, wherein the reference frame is different from the current frame, the operations comprising:

decoding the at least one encoded reference frame and the encoded motion vector so as to generate the reference frame and a motion vector;

storing the reference frame;

selecting one of a plurality of filters depending on the orientation of the motion vector;

generating a filtered reference block by applying the selected filter to the reference block; and generating the current block of the current frame on the basis of the motion vector and the filtered reference block.

* * * * *

UNITED STATES PATENT AND TRADEMARK OFFICE
CERTIFICATE OF CORRECTION

PATENT NO. : 10,536,716 B2  
APPLICATION NO. : 15/819801  
DATED : January 14, 2020  
INVENTOR(S) : Zhao et al.

It is certified that error appears in the above-identified patent and that said Letters Patent is hereby corrected as shown below:

In the Claims

Claim 12, Column 16, Line 38, "A method for predictive coding aa video stream" should read -- A method for predictive coding of a video stream --.

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*